April 14, 1936.　　　　M. MOONEY　　　　2,037,529
PLASTOMETER
Filed Aug. 11, 1932　　　4 Sheets-Sheet 2

INVENTOR
MELVIN MOONEY
BY
ATTORNEY

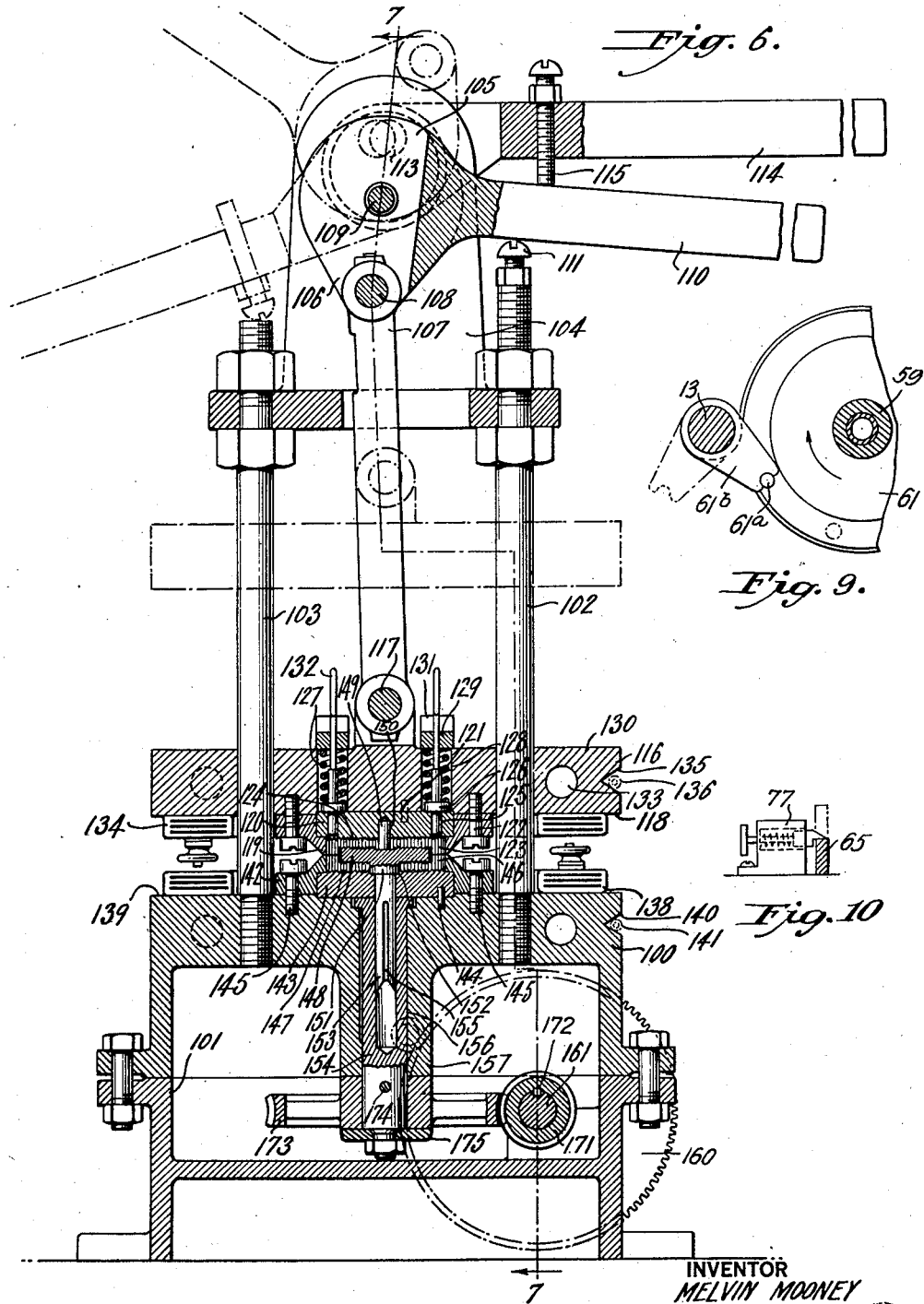

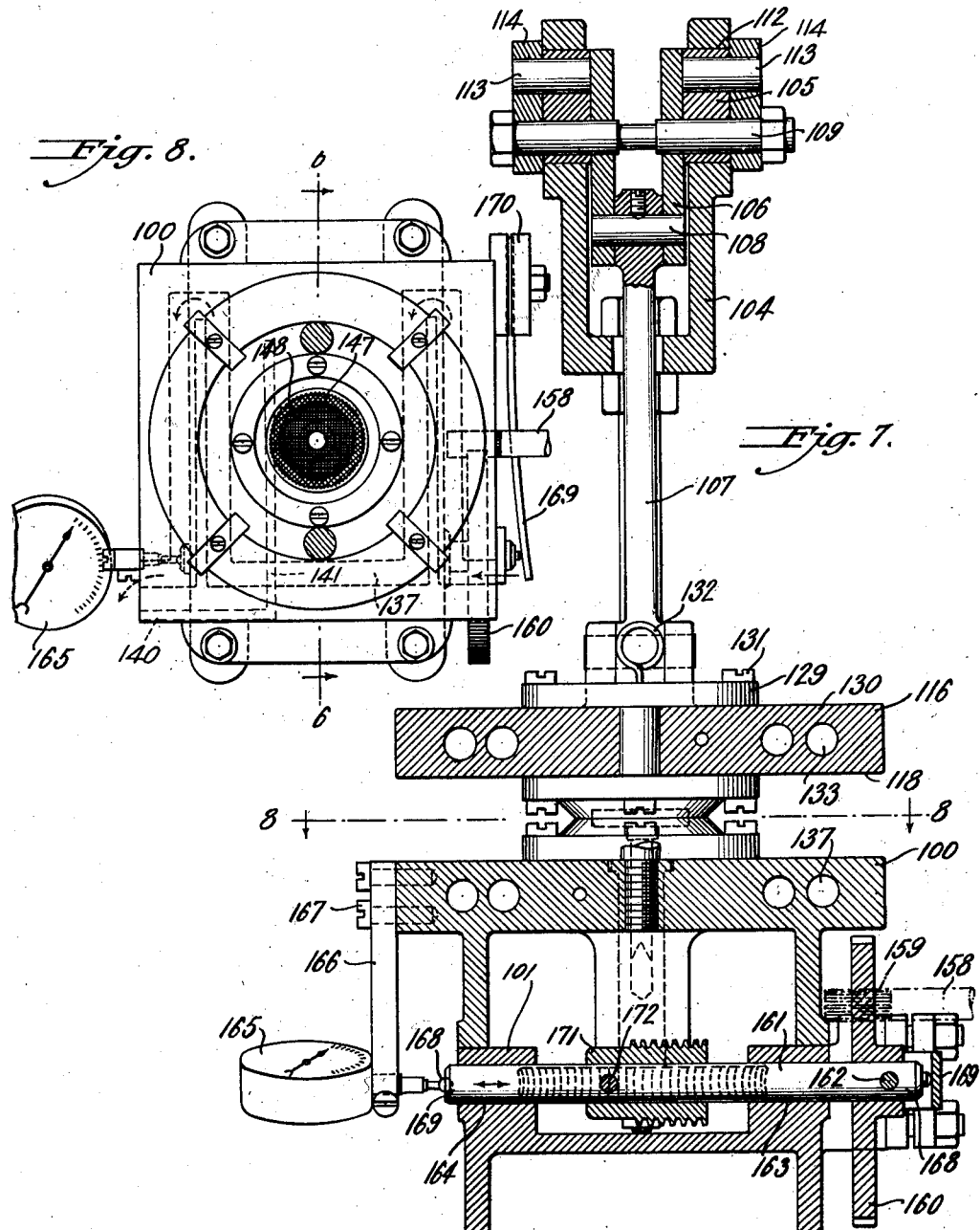

Patented Apr. 14, 1936

2,037,529

UNITED STATES PATENT OFFICE 2,037,529

PLASTOMETER

Melvin Mooney, East Rutherford, N. J., assignor, by mesne assignments, to United States Rubber Company, New York, N. Y., a corporation of New Jersey Application August 11, 1932, Serial No. 628,347

11 Claims. (Cl. 265—11)

This invention relates to plastometers and more particularly to an improved type of instrument for measuring the viscosity and the elastic recovery of rubber and plastic materials generally.

The term "plastometer" as applied to the present invention refers to an instrument for making certain quantitative physical tests on plastic materials, which tests are known to be related in a general way with the plasticity of the material, or the ease with which the material can be shaped or formed in manufacturing processes. Since there is no generally accepted quantitative definition of the property, plasticity, it is preferred to speak of measuring with the plastometer, not the plasticity, but those other properties which have been given precise and generally accepted definitions, such as viscosity and elastic recovery.

Experienced rubber technologists can make a rough estimate of the plasticity of a piece of rubber or compounded stock by pinching or stretching it, observing its behavior on a mill or calendar, or by other simple tests. A rough relative measure of plasticity is obtained by measuring the thickness of a sample which has been cut from a mill operating under standard conditions, and allowed to "shrink" or recover.

For making accurate measurements of the plasticity, various instruments have been used, all of them falling under the two classifications of (1) the extrusion plastometer, first used by B. Marzetti (Giorn. Chem. Ind. Appl., July 1923, page 342; Rubber Age, vol. 6, page 139, 1925); and (2) the compression plastometer, first used by Ira Williams (Ind. Eng. Chem., vol. 16, page 362, 1924).

In the extrusion plastometer, the rubber is packed into a cylindrical chamber, brought to a fixed temperature, and then forced out of the chamber through a small orifice, either by compressed air or by a piston. The rate of extrusion through the orifice under a fixed pressure is measured.

In the compression plastometer, a pellet of rubber of standard size and shape is heated to a fixed temperature, and then compressed under a fixed weight. The thickness of the compressed pellet is then measured after any chosen time interval or intervals. The elastic recovery may also be determined with this instrument by measuring the thickness of the pellet at a chosen time interval after the weight has been removed. In connection with the Williams compression plastometer, a theoretical formula for the absolute viscosity of the rubber has been developed by Healy (Transactions of the Institution of Rubber Industry, vol. 1, page 325, 1926) on the assumptions (a) that the viscosity at a given temperature is independent of the speed and extent of the deformation, (b) that the elastic deformation is negligible in comparison with the plastic or permanent deformation, and (c) that the vertical flow is negligible in comparison with the radial flow. A more general treatment of this problem was recently published by J. R. Scott (Trans. I. R. I., vol. 7, pp. 169–186, 1931). In Scott's analysis the viscosity is assumed to vary with the shearing force according to certain laws, and to be independent of the extent of deformation. Assumptions (b) and (c) made by Healy are retained. It is necessary to make these simplifying assumptions in order to carry through the mathematical analysis of the problem, but since the assumptions are only approximations to the truth, the viscosity calculated from the resulting formulae is roughly correct in order of magnitude but not exact.

One disadvantage of the extrusion and compression plastometers is that the measurements are not reliable unless the samples can be obtained free from all bubbles and air pockets. Another disadvantage of these types of plastometer is that measurements obtained with them are necessarily affected by the thixotropy of raw rubber, that is, its tendency to harden again after being milled. This thixotropic effect, which is quite marked in rubber, is distinct from the obvious hardening which accompanies cooling, as it may be observed in samples which are all measured at the same temperature but at different time intervals after milling. In the extrusion plastometer, for example, the rubber is given a single finite deformation and for all practical purposes this is true of the compression plastometer, since after the rubber has been deformed by a certain amount, further travel of the weight becomes too slow for satisfactory measurements. Consequently, as above stated, measurements obtained with these plastometers are affected by the thixotropy of the plastic material to be tested. Another practical disadvantage of the extrusion and compression types of plastometer is the time required to make a determination. Most of this time is taken up in bringing the sample to the temperature of the test, the preheating period varying from 12 to 60 minutes, depending upon the size and shape of the sample. Forming the sample is an additional operation, which also requires considerable time.

An object of the present invention is to provide an instrument for measuring the viscosity of rubber and plastic materials generally, in which the material is subjected to continuous shearing action. It is also an object of the invention to provide a plastometer in which the separate operation of preparing the sample is practically eliminated and in which the time necessary for a complete determination of the viscosity is reduced to a minimum.

It is a further object of the invention to provide a plastometer in which all air enclosed with or in the sample to be tested is worked out by the shearing action on the sample during the test.

It is also an object of this invention to provide a plastometer in which the plastic material may be sheared continuously for any desired time before measurements are made, and thereby be brought to a soft plastic condition, such for example, as rubber will attain on a warm-up mill, such operation reducing to a negligible amount the effect of the thixotropy of the plastic material on the measurements taken.

It is also an object of the invention to provide a plastometer wherein the plastic material is subjected to simple shear as contrasted with double or triple complex shears. A general treatment of shearing, and other strains appears in A. E. H. Love, The Mathematical Theory of Elasticity, third edition, Cambridge Press, chapter 1, articles 2, 3, 14, 16.

It is a further object of the invention to provide an instrument wherein several pieces of the plastic material to be tested taken from different places in a batch may be combined as a single composite sample, thereby yielding the average plasticity of the batch with a single measurement.

It is a further object of the invention to provide a plastometer which will measure the absolute viscosity or fluidity of a plastic material, and also its elastic recovery.

Other objects and advantages of the invention will more fully appear from the following detailed description taken in connection with the accompanying drawings, in which:

Fig. 6 illustrates a vertical section on the line 6—6 of Fig. 8, of a plant type of experimental and control plastometer;

Fig. 7 represents a vertical section on the line 7—7 of Fig. 6;

Fig. 8 shows a plan view of the base of the instrument taken on the line 8—8 of Fig. 7;

Fig. 9 is a detail view of the stop mechanism shown in Fig. 1; and

Fig. 10 is a detail view of a latch mechanism shown in Fig. 1.

Figure 1:
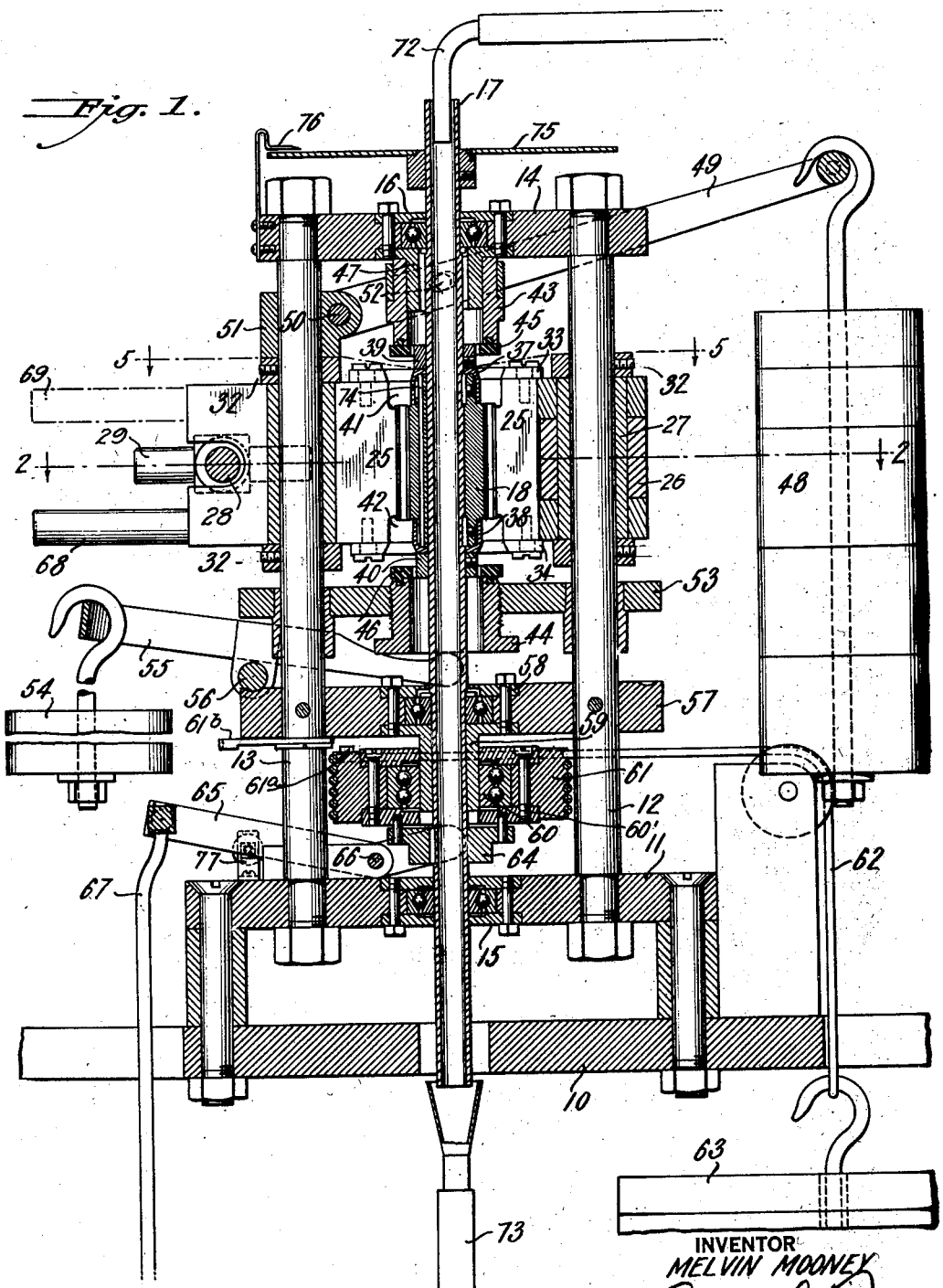
Figure 1 illustrates a vertical section on the line 1—1 of Fig. 2, of a laboratory type research plastometer.

The invention broadly consists of a process and apparatus for measuring the viscosity and elastic recovery of plastic or semi-solid materials wherein the material is subjected to a continuous shearing action. Two types of instruments are disclosed in the instant application, namely, a so-called laboratory type research plastometer, shown in Figs. 1 to 5, and a so-called plant type experimental and control plastometer shown in Figs. 6 to 8, but modifications of the apparatus shown may be readily made without departing from the present invention. The measurement of the viscosity in these two types of instruments is obtained while the sample of material to be tested is subjected to a continuous shearing action, and the sample is maintained under a continuous confining pressure while being so sheared in order to produce a true shearing action and prevent slippage of the material. Moreover, the shearing action is further characterized in that it is effected by simple shear, as contrasted with double or triple complex shears.

The average viscosity of a plastic material subjected to shearing action in the plastometer is proportional to the total shearing force divided by the average rate of shear, or—

Average coefficient of viscosity =
$$\text{constant} \times \frac{\text{total shearing force}}{\text{average rate of shear}}$$

It may readily be seen that if the ratio of the shearing force to the rate of shear can be determined, we have a measurement of the viscosity of the material in arbitrary units, that is, the relative viscosity, and if the constant of the instrument can be determined, then we may obtain the absolute viscosity of the material tested. In determining the ratio of the shearing force to the rate of shear, it is evident that if the material is subjected to a fixed shearing force and the rate of shear is measured, or if the material is subjected to a fixed rate of shear and the shearing force, or the resistance of the plastic material to the shearing action, is measured, then we may obtain the ratio of the shearing force to the rate of shear; and if the constant of the instrument is known, we may also obtain the absolute viscosity of the material.

In the laboratory research type plastometer, shown in Figs. 1 to 5, the plastic material is subjected to a fixed shearing force which is resolved in the instrument into a fixed and uniform shearing force per unit area, and the rate of shear of the material under this fixed shearing force is measured. The ratio of the fixed shearing force to the measured rate of shear will thus give a measure of the relative viscosity of the material. Furthermore, the constant of the instrument can be derived theoretically, and the absolute viscosity of the material may therefore be determined.

In the plant type of experimental and control plastometer, shown in Figs. 6 to 8, the plastic material is subjected to a fixed rate of shear, and the resistance of the plastic material to the shearing action is measured. This gives a measure of the viscosity of the material in arbitrary units. The constant of this instrument may, if desired, be calculated from the geometrical and other characteristics of the instrument, as is done with the laboratory type research plastometer, but the geometry is less simple in this case and the calculation is less exact. It is simpler, if it is desired to obtain absolute measurements of viscosity, to calibrate the instrument with plastic materials standardized in the laboratory type research plastometer. However, although the applied rate of shear in the factory type plastometer is fixed and constant, the actual shearing rate is not uniform, being different at different points in the sample. Consequently, regardless of whether the constant of the instrument is obtained by calculation or by calibration, the calculated viscosity, although expressed in absolute units, is an average viscosity, the average extending over the range in the rate of shear produced in the instrument.

There follows, under appropriate headings for convenience, description of the construction of the two types of plastometers and the operation of the same in making viscosity measurements.

Description of laboratory type research plastometer

Referring to Figures 1 to 5, wherein like reference characters designate the same parts throughout the several views, 10 represents a table to which the base plate 11 of the instrument is bolted and from which it is separated by suitable spacer means as shown. Attached to the base plate 11 are standards 12 and 13 to the upper ends of which is attached the top plate 14 of the instrument. In bearing blocks 15 and 16 in the base and top plates 11 and 14 respectively, is mounted a rotatable hollow shaft 17 to which is keyed at some distance below the top plate 14 a cylindrical rotor 18 having vertical corrugations 19 in the center portion thereof and whose end portions 20 are reduced and smooth, as shown in detail in Figures 3 and 4.

Figure 2:
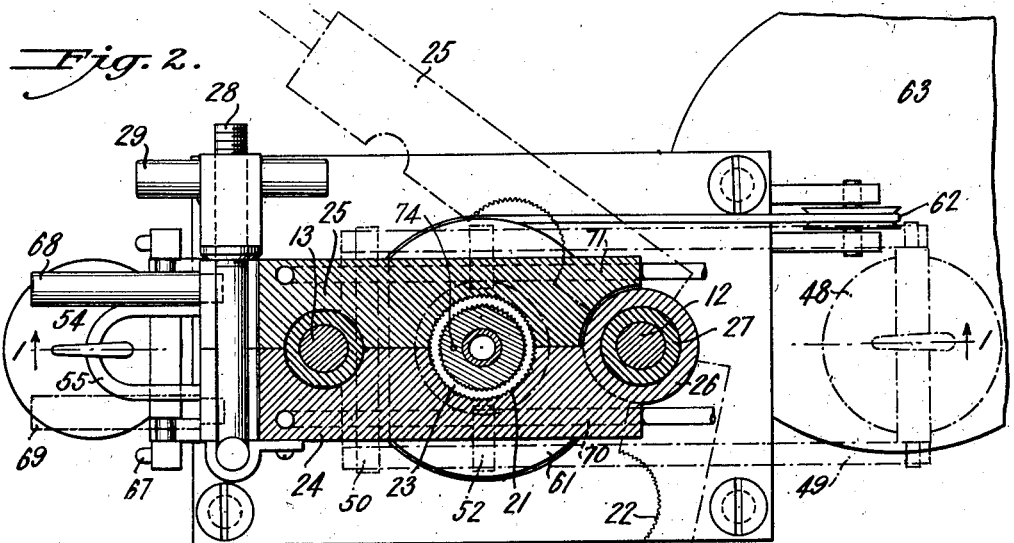
Fig. 2 represents a horizontal section on the line 2—2 of Fig. 1.

Co-axial with and spaced radially from rotor 18, is a non-rotating cylindrical surface or stator 21 with vertical corrugations 22 similar to the corrugations 19 on the rotor 18, and forming therewith an annular chamber 23 with vertically corrugated walls and into which the plastic material to be tested is placed. The cylindrical surface 21 is formed in the surfaces of two cooperating swinging blocks 24 and 25, hinged at 26 about a sleeve 27 on the standard 12. The blocks 24 and 25 may be swung from the position shown in section and clamped together and around the standard 13 by means of bolt 28 and nut 29 hinged on the block 24 and cooperating with block 25, as shown in Fig. 2. The corrugations in the cylindrical surface 21 in the blocks 24 and 25 are of the same length as the corrugations 19 in the cylinder 18, the upper and lower margins 30 and 31 of the cylindrical surface 21 being recessed and smooth as shown in detail in Fig. 3. Collars 32 are attached to the standards 12 and 13 above and below the blocks 24 and 25.

Figure 3:
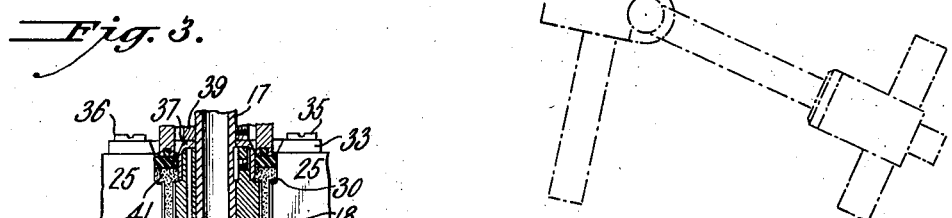
Fig. 3 shows a detailed view of parts of the construction shown in Fig. 1 in operative position.
Figure 5:
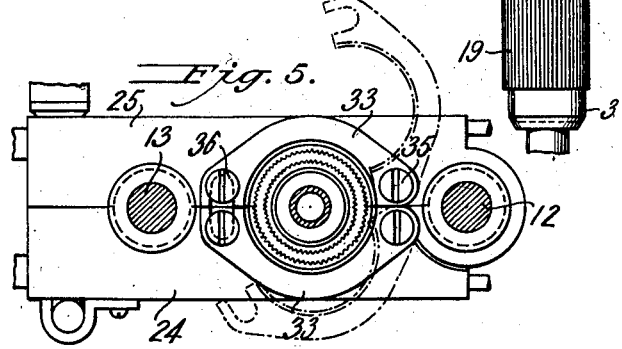
Fig. 5 represents a section on the line 5—5 of Fig. 1.

On the top and bottom surfaces of the blocks 24 and 25 are beveled guide plates 33 and 34 cooperating with the smooth upper and lower margins 30 and 31 of the cylindrical surface 21. In Figs. 1 and 3 are shown the top and bottom beveled guide plates 33 and 34 of the block 25. Corresponding beveled guide plates are also attached to the top and bottom of block 24. The top beveled guide plates 33 on the blocks 24 and 25 are shown in detail in Fig. 5. The plates 33 are free to rotate on the screws 35 and are guided into place by the screws 36. The plates 33 may be clamped into operating position as shown in Fig. 5 by tightening the screws 36 or by any other suitable clamping means. The bottom beveled guide plates 34 on the blocks 24 and 25 are constructed similar to the top guide plates 33.

Surrounding the reduced upper and lower portions of the cylinder 18 are beveled collars 37 and 38 which are free to rotate on the shaft 17 and are held in place by sleeves 39 and 40 secured by set screws to the shaft 17 and rotating therewith. The smooth upper and lower margins 30 and 31 of the cylindrical surface 21 form with the freely rotatable collars 37 and 38 surrounding the reduced end portions 20 of the cylinder 18, annular reservoirs 41 and 42 for plastic material held in reserve to maintain pressure in the annular chamber 23. Confining pressure is maintained in the reservoirs 41 and 42 by means of pressure rings 43 and 44 faced with vulcanized rubber pads 45 and 46. The upper pressure ring (shown out of engagement with the reservoir 41 in Fig. 1, and acting on the material in the reservoir to maintain pressure on the same in Fig. 3) is guided in its vertical movement by a guide 47 surrounding the shaft 17 and attached to the top plate 14. A weight 48 on lever arm 49 which is pivoted at 50 in a pivot block 51, attached to the standard 13 above the upper collar 32 on the standard 13, and which is connected to the pressure ring 43 at 52, maintains a constant pressure on the rubber ring 45 in contact with the material in the reservoir 41. The lower pressure ring 44 is adjustably mounted in plate 53 which is guided in its vertical movement by the standards 12 and 13. A weight 54 is hung on lever arm 55 which is pivoted at 56 on the intermediate plate 57 of the instrument. The other end of the lever arm engages the pressure ring 44 and maintains a constant pressure on the rubber ring 46 in contact with the material in the reservoir 42. The intermediate plate 57 is attached to the standards 12 and 13 and contains a bearing block 58 in which the shaft 17 is rotatable.

Depending from the intermediate plate 57 is a sleeve 59 in which the shaft 17 is rotatable. A raceway or bearing block 60 is mounted on said sleeve 59 and is free to slide vertically thereon. Rotatable on the slidable bearing block 60 is a sheave 61 around which is wound a steel cable 62 to the end of which is attached a driving weight 63. Below the sheave 61 and keyed to the shaft 17 is a clutch mechanism 64. The sheave 61 may be actuated into and out of engagement with the clutch by means of a forked lever 65 which engages the under surface of a keeper plate 60' for the raceway 60 and sheave 61 which slides the sheave 61 and bearing block 60 vertically, and which is pivoted on the base plate 11 at 66 and to which is attached a rod 67 for automatic or hand operation. The operation of lever 66 lifts the sheave 61 off the clutch 64. The sheave 61 is fitted with a stop 61a cooperating with a latch 61b for stopping the weight 63 when in motion.

The blocks 24 and 25 are fitted with handles 68 and 69 for swinging the blocks around the standard 12 on the hinges 26 and 27. The blocks 24 and 25 are fitted with circulating systems 70 and 71 for passing hot oil therethrough for maintaining a constant temperature. Hot oil is also passed by gravity through the hollow shaft 17 from source 72 and allowed to drain out through drain 73, thus avoiding the friction that would be involved in oil tight connections. The oil passing through the shaft 17 maintains the cylinder 18 at a constant temperature and the cylinder 18 is provided with a hole 74 for the insertion of a thermo-couple before and after testing. Keyed to the upper end of the shaft 17 is a graduated disc 75 which rotates with the shaft 17 under a fixed pointer 76 attached to the top plate 14. A catch 77 is attached to the base plate 11 and, as shown in Fig. 10, is adapted to hold the lever 65 in a depressed or unclutched position.

*Operation of laboratory type research plastometer*

Figure 4:
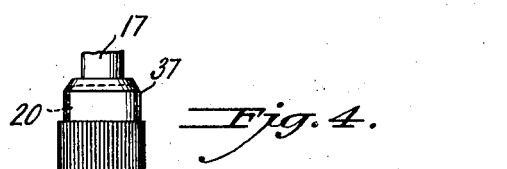
Fig. 4 shows an enlarged view of the rotatable corrugated cylinder of the instrument shown in Figs. 1 and 2.

A measurement of the absolute viscosity of the material to be tested and the elastic recovery of the same may be made in the research plastometer as described below. With the pressure rings 43 and 44 in receding position as shown in Fig. 1, and the blocks 24 and 25 swung into open position, as shown in dot and dash lines in Fig. 2, the sample to be tested is inserted within the cylindrical surfaces 21. The swinging blocks 24 and 25 are closed and clamped into position by means of the bolt 28 and nut 29. Guide plates 33 and 34 are swung out of the way, as shown in Fig. 5, and the excess rubber above and below the reservoirs 41 and 42, which has been pressed into the same by the closing of the blocks 24 and 25, is trimmed off with a knife. The guide plates 33 and 34 are then placed in position and locked. The pressure rings 43 and 44, faced with pads 45 and 46, are forced into position with the pads 45 and 46 exerting pressure on the material in the reservoirs 41 and 42 by means of the weights 48 and 54. The material to be tested is left in the chamber 23 two minutes to permit the material to attain the temperature of the instrument. The driving weight 63 operating through the steel cable 62, the sheave 61, and the clutch 64, is then allowed to turn the rotor 18. This produces a shearing action on the rubber contained in the chamber 23 between the corrugations 19 on the rotor 18 and the corrugations 22 in the stator 21. The beveled collars 37 and 38, as clearly shown in Figs. 3 and 4, are free to rotate on the hollow shaft 17. The pressure pads 45 and 46 acting on the material in the reservoirs 41 and 42 maintain a continuous and constat confining pressure on the material to be tested while it is being sheared by the rotation of the cylinder 18, thereby preventing slippage on the corrugations 19 and 22. The beveled collars 37 and 38 serve to prevent the rubber in the reservoirs 41 and 42 from sticking to the rotor and retarding this motion. After the cylinder 18 has been rotated by means of the weight 63 and the weight has reached the floor, the clutch 64 may be released, and the weight raised and made ready to rotate the shaft again. The rate of rotation of the cylinder 18 may be measured with a stop watch or other suitable means with the help of the graduated disc 75 and fixed pointer 76. When the sheave 61 is released from the clutch 64, the elastic forces in the plastic material being tested cause the rotor to jerk backwards through a small angle and then to continue to creep slowly for some time. The extent of this reverse rotation is a measure of the elastic recovery of the material and may be determined by the disc 75 and the pointer 76.

As stated above, in general terms, the instrument is characterized by the formula $$\eta = \frac{1}{\phi} = K\frac{T}{\omega}$$

in which $\eta$=coefficient of viscosity,
$\phi$=fluidity,

T=torque applied to rotor (proportional to shearing force),
$\omega$=angular velocity of rotation under the torque T, expressed in radians per second (proportional to rate of shear),
K=the constant of the instrument.
The value of K is $$K = \frac{R_2^2 - R_1^2}{4\pi L R_2^2 R_1^2}$$

in which $R_1$=radius of rotor,
$R_2$=radius of stator,
L=length of rotor or stator.

The derivation of this formula, in slightly different notation, is given in "Explicit formulas for slip and fluidity", M. Mooney, Journal of Rheology, vol. 2, p. 210 (1931). From this formula and measurements of the torque T applied to the rotor and the angular velocity of rotation of the shaft 17 or plate 75, under the torque T, the coefficient of viscosity may be calculated. The elastic recovery, in absolute units, or angle of simple shear, may also be calculated from the following formula:

$$\alpha = \theta \frac{R_2^2 + R_1^2}{R_2^2 - R_1^2}$$

in which $\alpha$=angle of recovery, expressed in radians,
$\theta$=angular displacement of the rotor during recovery, expressed in radians.

*Description of the plant type, experimental and control plastometer*

Referring now to Figures 6 to 8, wherein like reference characters designate the same parts throughout the several views, 100 represents the base plate of the instrument on the housing 101. To the base plate 100 are attached standards 102 and 103 on the upper ends of which is mounted superstructure 104 in which eccentric 105 and crank 106 operate to raise and lower connecting rod 107.

The upper end of the connecting rod 107 is attached to the crank 106 at 108 and the crank is pivoted on shaft 109 and made to operate through handle 110. An adjustable screw 111 on the top of standard 102 acts as a stop for the handle 110 of the crank in its downward movement which lowers connecting rod 107. The pivot shaft 109 of the crank is also mounted in circular eccentric 105 which rotates in a corresponding circular bearing surface 112 in the superstructure 104. The eccentric may be operated in the bearing surface 112 through a forked handle 114 connected to the eccentric by the shaft 109 and the two pins 113. The handle 114 carries an adjustable screw 115 which rests on handle 110 of the crank 106 and limits the downward movement of the eccentric. The head of the screw 115 also rests on the top of standard 103 when the eccentric is rotated to raise the connecting rod 107. In Fig. 6 the eccentric 105 and the crank 106 are shown in solid lines in their lowered position and the dot and dash lines when the connecting rod 107 is in raised position.

The lower end of the connecting rod 107 is pivoted to the top plate 116 of the instrument by means of shaft 117. Raising and lowering of the connecting rod 107 by means of eccentric 105 and crank 106 act to raise and lower the top plate 116 which is guided in its movement by standards 102 and 103 passing through holes in the same. Attached to the bottom surface 118 of the top plate 116 is a shouldered collar 119, which retains the plate 120 which is keyed at 121 to the top plate, against the bottom surface 118 by means of screws 122. The lower margin 123 of the collar 119 is corrugated and forms with the bottom surface of the plate 120 the upper half of the stator or outer wall of the chamber for containing the sample to be tested. The lower surface 124 of the plate 120 is roughened by cross-hatching, to eliminate slippage of the sample to be tested, for example, by cutting grooves at right angles to one another in the surface.

The plate 120 contains two cylindrical chambers 125 in which are located plungers 126 backed up by heavy springs 127 in holes 128 in the top plate 116. The springs 127 are kept in engagement with the plungers 126 by means of an annular collar 129 attached to the top surface 130 of the top plate 116 by means of screws 131. The plungers 126 are formed with ring tops 132 protruding from the top surface of the annular ring 129. The top plate 116 is provided with passages 133 for passage of a fluid medium for temperature regulation constructed similarly to the passages in the base plate 100 shown in detail in dotted lines in Fig. 8. The top plate is also provided with electric heating means 134, and with a groove 135 on one side for reception of the stem of a thermometer 136. The thermometer is received in a hole which is at right angles to the groove 135 and extends to the center of the top plate 116, corresponding to those in plate 100 shown in Fig. 8. The stem of the thermometer is bent at right angles so as to lie in the groove.

The base plate 100, similar to the top plate 116, contains passages 137 for the passage of a fluid medium for temperature regulation. The passages are shown in detail in dotted lines in Fig. 8 and the arrows show the path of flow of the fluid medium. The base plate 100 is also provided with electric heating means 138 on the top surface 139 thereof and contains a groove 140 on one side thereof for reception of the stem of a thermometer 141, similar to the thermometer 136 in groove 135 in top plate 116.

Attached to the top surface 139 of the base plate 100 is a shouldered collar 142 similar to the shouldered collar 119 attached to the bottom surface of the top plate 116. The collar 142 retains the plate 143, which is keyed at 144, against the top surface 139 by means of screws 145. The upper margin 146 of the collar 142 is corrugated, thus forming with the upper surface of the plate 143 the lower half of the stator or outer wall of the chamber for containing the sample to be tested. The upper surface 147 of the plate 143 is roughened to eliminate slippage of the sample to be tested by cutting grooves at right angles to one another in the surface.

Co-axial with the stator and disposed within the chamber for containing the sample to be tested, is the rotor 148. The top and bottom surfaces of the rotor are cut with grooves at right angles to one another similar to the surfaces 124 and 147 of the plates 120 and 143. The periphery of the rotor is corrugated similar to the surfaces 123 and 146 of the collars 119 and 142. The rotor 148 is retained centrally by means of upper spacer pin 149 fitting into a socket 150 in the plate 120 and also by a lower shoulder 151 carried by the rotor fitting into a socket 152 in the plate 143. The shaft 153 for the rotor 148 is inserted into a hollow spindle 154 and keyed to it by key 155. The spindle 154 may be rotated in the vertical bearing 156 in the depending portion 157 of base plate 100 by means presently to be described.

Drive shaft 158 with gear teeth 159 cut in the end thereof which mesh with rotary gear 160 is driven by a synchronous motor not shown. The rotary gear 160 is keyed to shaft 161 and is held fast to the shaft by means of pin 162. The shaft 161 is rotatable in horizontal bearings 163 and 164 in the housing 101. The shaft 161 and gear 160 are movable horizontally, the gear 160 being in sliding mesh with the gear teeth 159 on drive shaft 158. A standard micrometer gage 165 is mounted in bracket 166 attached to the base plate 100 by screws 167, and the bearing pin 168 of the gage is made to contact with one end 169 of the shaft 161. The other end 168 of the shaft 161 contacts with the leaf spring 169 held in mounting block 170 attached to the housing 101. A worm 171 is also keyed to the shaft 161 and is held in position on the shaft by pin 172. The worm 171 meshes with a worm gear 173 which is keyed to the vertical spindle 154 and held in position on it by means of pin 174 and lock plate 175.

*Operation of the plant type experimental and control plastometer*

In obtaining a measurement of the viscosity by means of the plant type plastometer, top plate 130 is raised to its upper position, as shown in dot and dash lines in Fig. 6, by means of eccentric 105 and crank 106. The rotor 148 carrying stem or shaft 153 is then removed and the shaft 153 of the rotor is forced through a sheet or slab of the material to be tested, and the rotor is then placed in the machine and pushed down into engagement with the drive spindle 154. In this manner the material to be tested is introduced between the bottom grooved surface of the rotor and the top grooved surface of the plate 143. Another piece of the material to be tested is then placed on top of the rotor and the top plate 130 is forced into its lower position by means of levers connected to the eccentric 105 and crank 106. As the edges of the shouldered collars 119 and 142 approach one another, the resistance to flow of the excess which is being squeezed out of the testing chamber increases, and some of the plastic material, as the collars finally come into engagement with one another, is forced up into the reservoirs 125 against the plungers 126. These plungers are held against springs 127 and hence at all times maintain a confining pressure on the material in the testing chamber so that slippage of the material over the corrugations is eliminated and rotation of the rotor 148 will produce a continuous shearing action on the plastic material. After the material has remained in the testing chamber for a minute or so and has come to the temperature of the instrument, the synchronous motor attached to the drive shaft 158 is started and this in turn through the gears 159 and 160, and 171 and 173 produces a rotation of the rotor 148, thereby shearing continuously the sample being tested. The resistance to this shearing deformation of the sample tested develops a thrust in the shaft 161 which presses against the leaf spring 169 and deflects it until the opposing force of the spring is equal to the thrust in the shaft. This deflection is read on the gage 165 and is a measure of the shearing force, or the resistance of the material to the shearing action. The gage reading usually passes through a maximum, sometimes followed by a minimum and finally, within one minute as a rule, becomes constant. This constant reading is taken as the measure of the relative viscosity of the rubber. The high initial reading, followed by a lower reading, is due principally to the thixotropy of the rubber or its tendency to soften temporarily while being worked. A minimum in the gage reading, when it occurs, is due to air which has not yet been worked out of the rubber; but as the air is gradually eliminated, the gage reading gradually increases to its proper value.

The formula for the absolute viscosity of material to be tested, as above stated, may be developed from the geometrical and other characteristics of the instrument as in the laboratory type research plastometer; but it is preferable, as a general rule, to calibrate the plant type plastometer, when absolute measurements of viscosity are desired, against samples standardized in the laboratory type research plastometer. For practically all experimental and control purposes, however, all that is desired is a measurement of the relative viscosity of various materials, for which the plant type plastometer suffices.

With the above detailed disclosures of the invention, it is evident that numerous modifications will suggest themselves to those skilled in the art, and it is not desired to limit the invention otherwise than as set forth in the appended claims.

Having thus described my invention, what I claim and desire to protect by Letters Patent is:

1. A measuring instrument comprising means for subjecting a constant volume of plastic material to a shearing action, means acting directly on the plastic material and maintaining it under confining pressure and constant volume in the shearing zone while being so sheared, and means for indicating a resultant of the shearing force during said shearing action.

2. A measuring instrument comprising a rotor and a stator spaced from each other normally in fixed relation to provide a chamber of fixed volume for test material, the material-engaging faces of said rotor and stator being roughened, and separate means operating independently of said rotor and stator for maintaining the chamber full of material and under continuous confining pressure, whereby slippage between the material and the roughened surfaces is prevented when the material is sheared.

3. A measuring instrument comprising a stator and a rotor in fixed relative positions with clearance therebetween to provide a chamber of fixed volume for test material, the material-engaging surfaces of said stator and rotor being roughened, and separate means operating independently of said rotor and stator for maintaining the material under continuous confining pressure, whereby slippage between the material and the roughened surfaces is prevented when the material is sheared.

4. A measuring instrument comprising relatively movable parts defining a hollow stator, a rotor disposed within said stator whereby upon the closing of said relatively movable parts a substantially fixed volume of material is confined about the rotor, the material-engaging surfaces of said stator and rotor being roughened, and means operating independently of the rotor for applying a continuous compressive force to the material, whereby slippage is prevented between the roughened surfaces and the confined material when the material is sheared.

5. In a testing machine, a rotor, a plurality of relatively movable stator sections for closing about said rotor in fixed spaced relation thereto to automatically enclose a fixed volume of material to be tested, and means for maintaining the material under continuous confining pressure.

6. In a measuring instrument, a stator, a rotor in fixed spaced relation to said stator to provide a chamber for test material, a reservoir communicating with said chamber, and pressure means acting upon the material in said reservoir for maintaining the material in the reservoir and chamber under continuous confining pressure without interfering with the shearing action of the rotor upon the material within the chamber.

7. In a testing instrument, a stator, a rotor in fixed spaced relation to said stator for defining a chamber of fixed volume for material under test, a reservoir outside of the zone of shearing action between the rotor and stator and communicating with said chamber, and means acting upon the material in said reservoir for maintaining the material in said reservoir and chamber under continuous confining pressure.

8. A measuring instrument comprising a rotor with a roughened surface, a stator with a roughened surface and composed of movable sections, means for forcing the movable sections of the stator into fixed positions relative to the rotor so as to cut and form a sample of test material about the rotor, separate means for applying continuous confining pressure to the sample without altering the relative position of stator and rotor, and means for measuring the resistance of the sample to relative movement between the stator and the rotor.

9. A measuring instrument comprising a rotor with a roughened surface, a stator with a roughened surface and composed of movable sections, means for forcing the movable sections of the stator into fixed positions relative to the rotor so as to cut and form a sample of test material about the rotor, and separate means for applying continuous confining pressure to the sample without altering the relative position of stator and rotor.

10. A measuring instrument comprising a stator and a rotor in fixed relative positions with clearance therebetween to provide a chamber of fixed volume for test material, the material-engaging surfaces of said stator and rotor being roughened, separate means operating independently of said rotor and stator for maintaining the material under continuous confining pressure whereby slippage between the material and the roughened surfaces is prevented when the material is sheared, and measuring means associated with the rotor.

11. In a measuring instrument, a stator, a rotor in fixed spaced relation to said stator to provide a chamber of fixed volume for test material, a reservoir communicating with said chamber, pressure means acting upon the material in said reservoir for maintaining the material in the reservoir and chamber under continuous confining pressure without interfering with the shearing action of the rotor upon the material within the chamber, and means for measuring a force responsive to the shearing action in the material.

MELVIN MOONEY.